(12) United States Patent
Muller et al.

(10) Patent No.: US 10,818,080 B2
(45) Date of Patent: Oct. 27, 2020

(54) PIECEWISE-POLYNOMIAL COUPLING LAYERS FOR WARP-PREDICTING NEURAL NETWORKS

(71) Applicants: Disney Enterprises, Inc., Burbank, CA (US); ETH Zurich, Zurich (CH)

(72) Inventors: Thomas Muller, Rheinfelden (DE); Brian McWilliams, Zurich (CH); Fabrice Pierre Armand Rousselle, Ostermundigen (CH); Jan Novak, Zurich (CH)

(73) Assignees: Disney Enterprises, Inc., Burbank, CA (US); ETH Zürich (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 43 days.

(21) Appl. No.: 16/157,986

(22) Filed: Oct. 11, 2018

(65) Prior Publication Data
US 2020/0035016 A1    Jan. 30, 2020

Related U.S. Application Data

(60) Provisional application No. 62/718,806, filed on Aug. 14, 2018, provisional application No. 62/703,370, filed on Jul. 25, 2018.

(51) Int. Cl.
*G06N 7/00* (2006.01)
*G06T 15/50* (2011.01)
(Continued)

(52) U.S. Cl.
CPC ......... *G06T 15/506* (2013.01); *G06N 3/0454* (2013.01); *G06N 3/08* (2013.01);
(Continued)

(58) Field of Classification Search
CPC ..... G06T 15/506; G06T 15/005; G06T 15/06; G06N 3/0454; G06N 3/10; G06N 3/08; G06N 7/005
See application file for complete search history.

(56) References Cited

U.S. PATENT DOCUMENTS 7,300,398 B2 * 11/2007 Chefd'hotel ............. G06T 7/33
382/128
10,235,601 B1 * 3/2019 Wrenninge .......... G06K 9/6256
(Continued)

OTHER PUBLICATIONS

Ren, P.; et al. "Global Illumination with Radiance Regression Functions," ACM Trans. Graph. 32, 4, Article 130 (Jul. 2013), 12 pages.
(Continued)

*Primary Examiner* — Samantha (Yuehan) Wang
(74) *Attorney, Agent, or Firm* — Farjami & Farjami LLP

(57) ABSTRACT

According to one implementation, a system includes a computing platform having a hardware processor and a system memory storing a software code including multiple artificial neural networks (ANNs). The hardware processor executes the software code to partition a multi-dimensional input vector into a first vector data and a second vector data, and to transform the second vector data using a first piecewise-polynomial transformation parameterized by one of the ANNs, based on the first vector data, to produce a transformed second vector data. The hardware processor further executes the software code to transform the first vector data using a second piecewise-polynomial transformation parameterized by another of the ANNs, based on the transformed second vector data, to produce a transformed first vector data, and to determine a multi-dimensional output vector based on an output from the plurality of ANNs.

20 Claims, 4 Drawing Sheets

(51) Int. Cl.
  *G06N 3/04* (2006.01)
  *G06T 15/06* (2011.01)
  *G06N 3/08* (2006.01)
  *G06T 15/00* (2011.01)
  *G06N 3/10* (2006.01)

(52) U.S. Cl.
  CPC ............. *G06N 3/10* (2013.01); *G06T 15/005* (2013.01); *G06T 15/06* (2013.01)

(56) References Cited

U.S. PATENT DOCUMENTS

| | | | | |
|---|---|---|---|---|
| 2015/0348318 | A1* | 12/2015 | Meyer | G01C 21/26 701/532 |
| 2019/0018933 | A1* | 1/2019 | Oono | G06N 3/0472 |
| 2019/0066847 | A1* | 2/2019 | Jung | G06K 9/00201 |
| 2019/0171908 | A1* | 6/2019 | Salavon | G06N 3/0454 |
| 2019/0286951 | A1* | 9/2019 | Rabinovich | G06N 3/082 |

OTHER PUBLICATIONS

Keller, Alexander; et al. "Integral Equations and Machine Learning," arXiv:1712.06115v2 [cs.LG]. Nov. 2018. pp. 1-16.

K. Dahm, A. Keller; "Learning Light Transport the Reinforced Way," *Monte Carlo and Quasi-Monte Carlo Methods. MCQMC 2016. Proceedings in Mathematics & Statistics*, vol. 241, Springer, 2018, pp. 181-195.

Vorba, J.; et al. "On-line Learning of Parametric Mixture Models for Light Transport Simulation." *ACM Transactions on Graphics*, 33(4): 101, 2014. pp. 1-11.

Budge, B. C.; Anderson, J. C.; and Joy, K. I. "Caustic forecasting: Unbiased estimation of caustic lighting for global illumination," *Computer Graphics Forum 27*, 7, 2018. pp. 1963-1970.

Rezende, Danilo J.; et al. "Variational Inference with Normalizing Flows," *Proceedings of the 32nd International Conference on Machine Learning*, Lille, France, 2015. JMLR: W&CP vol. 37. pp. 1-9.

Herholz, Sebastian; et al. "Product Importance Sampling for Light Transport Path Guiding," *Eurographics Symposium on Rendering 2016*, vol. 35, No. 4. pp. 1-11.

Dinh, Laurent; et al. "Density Estimation Using Real NVP," *ICLR 2017*, arXiv:1605.08803v3 [cs.LG] Feb. 27, 2017. pp. 1-32.

Hey, Heinrich; et al. "Importance Sampling with Hemispherical Particle Footprints," *Proceedings of the 18$^{th}$ Spring Conference on Computer Graphics*. Budmerice, Slovakia, Apr. 2002. pp. 1-12.

Lafortune E.P., Willems Y.D. (1995) "A 5D Tree to Reduce the Variance of Monte Carlo Ray Tracing." In: Hanrahan P.M., Purgathofer W. (eds) *Rendering Techniques '95. Eurographics.* Springer, Vienna. pp. 1-11.

Jensen H.W. (1995) Importance Driven Path Tracing using the Photon Map. In: Hanrahan P.M., Purgathofer W. (eds) *Rendering Techniques '95. Eurographics.* Springer, Vienna. pp. 1-11.

Steinhurst, Joshua, et al. "Global Importance Sampling of Glossy Surfaces Using the Photon Map," *In IEEE Symposium on Interactive Ray Tracing*, 2006. pp. 1-6.

* cited by examiner

PIECEWISE-POLYNOMIAL COUPLING LAYERS FOR WARP-PREDICTING NEURAL NETWORKS

RELATED APPLICATION(S)

The present application claims the benefit of and priority to Provisional Patent Application Ser. No. 62/703,370, filed Jul. 25, 2018, and titled "Piecewise-Polynomial Coupling Layers for Warp-Predicting Neural Networks," and Provisional Patent Application Ser. No. 62/718,806, filed Aug. 14, 2018, and titled "Neural Importance Sampling," both of which are hereby incorporated fully by reference into the present application.

BACKGROUND

When rendering images with path-tracing algorithms, light paths need to be constructed to connect emitters to sensors. The sampling distributions used for constructing these paths directly influence the estimation error, i.e., noise, and the efficiency of rendering. A large body of research has been devoted to developing methods for constructing high-energy light paths, such as bidirectional path tracing, metropolis light transport, or offsetting inefficiencies by reusing computation (e.g. photon mapping, many-light rendering, gradient-domain rendering, and/or control variates). While these algorithms perform well in certain applications, they tend to under-perform in others.

SUMMARY

There are provided systems including warp-predicting neural networks having piecewise-polynomial coupling layers, and methods for use by such systems, substantially as shown in and/or described in connection with at least one of the figures, and as set forth more completely in the claims.

DETAILED DESCRIPTION

Figure 1:
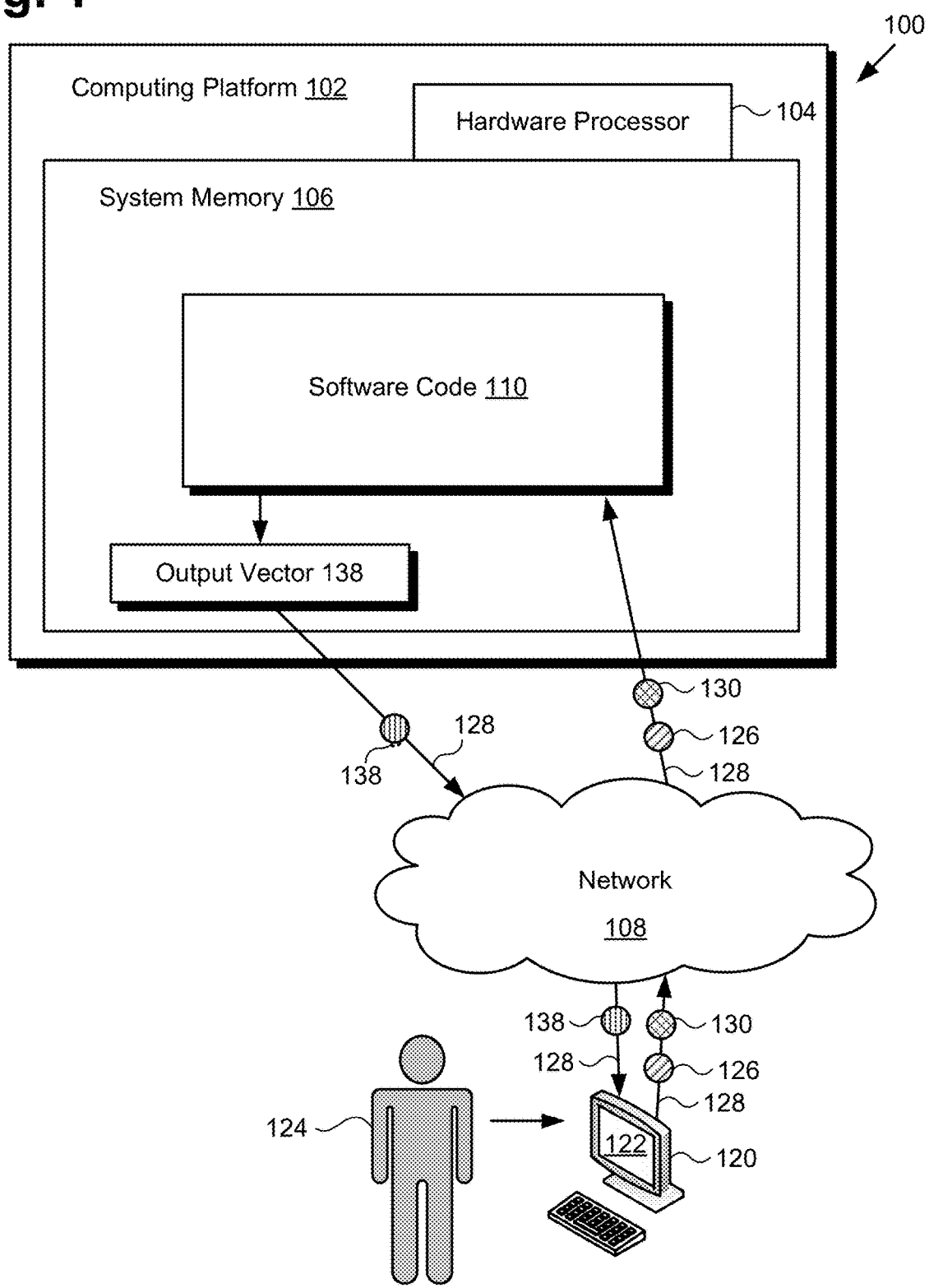
FIG. 1 shows a diagram of an exemplary system including a software code utilizing warp-predicting neural networks having piecewise-polynomial coupling layers, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system including a software code utilizing warp-predicting neural networks having piecewise-polynomial coupling layers, according to one implementation. As shown in FIG. 1, system 100 includes computing platform 102 having hardware processor 104, and system memory 106 implemented as a non-transitory storage device. According to the present exemplary implementation, system memory 106 stores software code 110.

As further shown in FIG. 1, system 100 is implemented within a use environment including communication network 108, user system 120 including display 122, and user 124 utilizing user system 120. Also shown in FIG. 1 are network communication links 128 interactively connecting user system 120 and system 100 via communication network 108, multi-dimensional input vector 130, auxiliary data 126, and multi-dimensional output vector 138 corresponding to multi-dimensional input vector 130 and determined using software code 110.

It is noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110 as being stored in its entirety in system memory 106, that representation is also provided merely as an aid to conceptual clarity. More generally, system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within system 100. Thus, it is to be understood that various features of software code 110, such as one or more of the features described below by reference to FIG. 2, may be stored and/or executed using the distributed memory and/or processor resources of system 100.

According to the implementation shown by FIG. 1, user 124 may utilize user system 120 to interact with system 100 over communication network 108. In one such implementation, system 100 may correspond to one or more web servers, accessible over a packet-switched network such as the Internet, for example. Alternatively, system 100 may correspond to one or more computer servers supporting a local area network (LAN), or included in another type of limited distribution network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example. User 124 may utilize user system 120 to interact with system 100 to use software code 110, executed by hardware processor 104, to determine multi-dimensional output vector 138 corresponding to multi-dimensional input vector 130.

It is noted that, in various implementations, multi-dimensional output vector 138, when determined using software code 110, may be stored in system memory 106 and/or may be copied to non-volatile storage. Alternatively, or in addition, as shown in FIG. 1, in some implementations, multi-dimensional output vector 138 may be sent to user system 120 including display 122, for example by being transferred via network communication links 128 of communication network 108. Display 122 may be implemented as a liquid crystal display (LCD), a light-emitting diode (LED) display, an organic light-emitting diode (OLED) display, or another suitable display screen that performs a physical transformation of signals to light.

Figure 2:
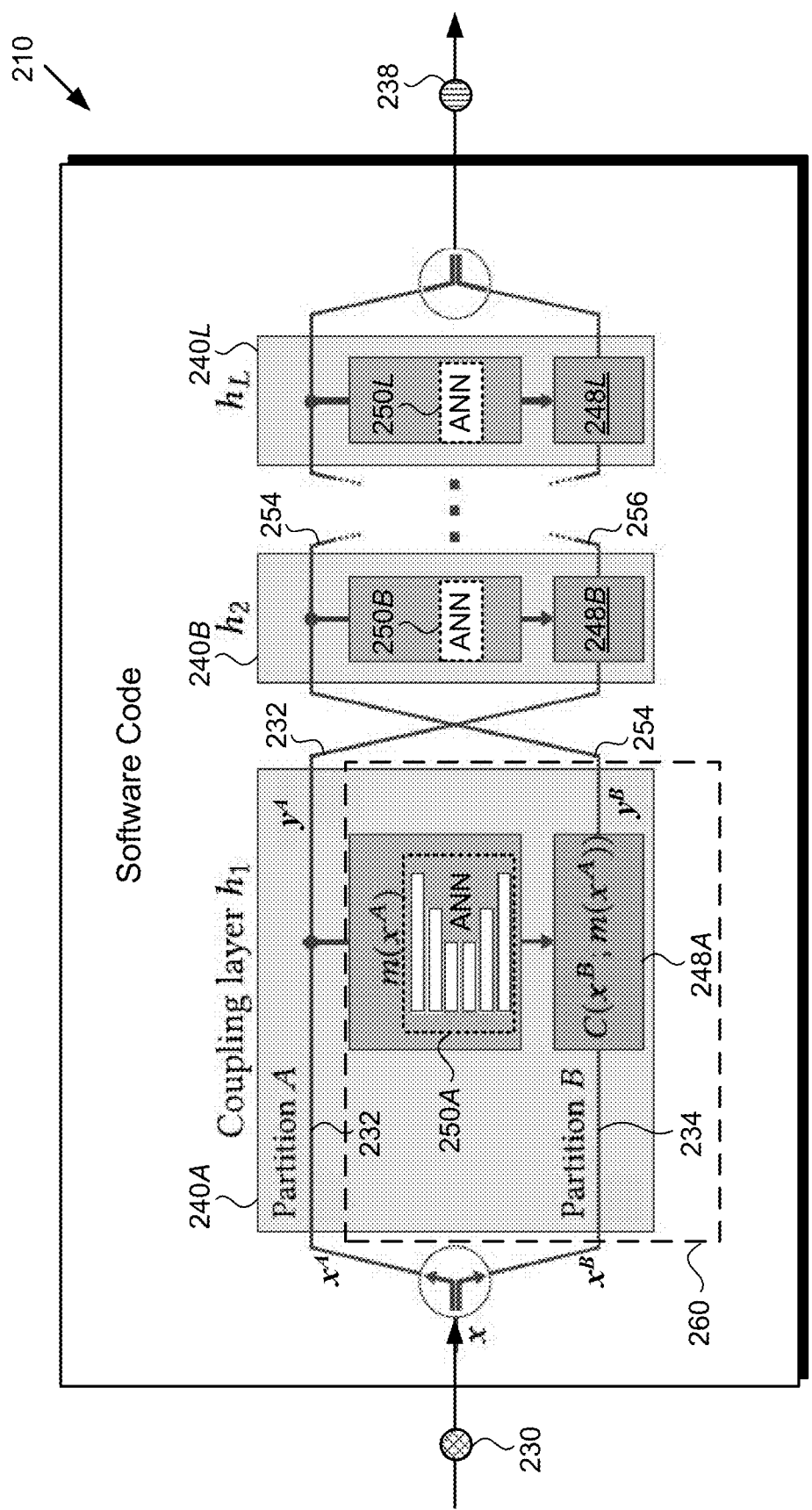
FIG. 2 shows a diagram of some exemplary features of a software code suitable for execution by a hardware processor of the system shown in FIG. 1, according to one implementation.

FIG. 2 shows some features of exemplary software code 210 suitable for execution by hardware processor 104 of computing platform 102, in FIG. 1, according to one implementation. As shown in FIG. 2, software code 210 may include multiple coupling layers 240A, 240B, ... 240L (also referred to as "$h_1$", "$h_2$", ... "$h_L$", respectively), each including a respective ANN 250A, 250B, ... 250L, where "L" can take any integer value greater than or equal to two (2.0). In addition, FIG. 2 shows multi-dimensional input vector 230 and multi-dimensional output vector 238 determined using software code 210 and corresponding to multi-dimensional input vector 230. Also shown in FIG. 2 are first vector data 232 and second vector data 234 partitioned out of multi-dimensional input vector 230, piecewise-polynomial transformations 248A, 248B, ... 248L applied by respective coupling layers 240A, 240B, ... 240L, transformed second vector data 254, transformed first vector data 256, and exemplary portion 260 of software code 210, which is shown in greater detail in FIG. 4.

Multi-dimensional input vector 230 and multi-dimensional output vector 238 correspond respectively in general to multi-dimensional input vector 130 and multi-dimensional output vector 138, in FIG. 1, and those corresponding features may share any of the characteristics attributed to either corresponding feature by the present disclosure. In addition, software code 210 corresponds in general to software code 110, and those corresponding features may share any of the characteristics attributed to either corresponding feature by the present disclosure. That is to say, like software code 210, software code 110 may include multiple coupling layers 240A, 240B, ... 240L each including a respective one of ANN 250A, 250B, ... 250L. Thus, software code 110/210 includes multiple ANNs 250A, 250B, ... 250L.

Referring to FIGS. 1 and 2 in combination, user 124 may utilize user system 120 to interact with system 100 to determine multi-dimensional output vector 138/238 based on multi-dimensional input vector 130/230, as well as, in some implementations, auxiliary data 126. For example, software code 110/210, when executed by hardware processor 104, may provide multi-dimensional output vector 138/238 for use in simulation of light transport in a three-dimensional (3D) scene based on multi-dimensional input vector 130/230 and auxiliary data 126. Such simulation of light transport may take the form of light path sampling or light path guiding, for instance.

When used in simulation of light transport, multi-dimensional output vector 138/238 may undergo a Monte Carlo integration. Moreover, in those implementations, coupling layers 240A, 240B, ... 240L including respective ANNs 250A, 250B, ... 250L generate the random numbers used by the light transport simulation, based on multi-dimensional input vector 130/230 and auxiliary data 126. It is noted, however, that a simulation of light transport performed using multi-dimensional output vector 138/238 may access additional data not used by or accessible to software code 110/210.

Hardware processor 104 of computing platform 102 may execute software code 110/210 to determine multi-dimensional output vector 138/238 using non-linear independent component estimation (NICE). In one implementation, software code 110/210 uses coupling layers 240A, 240B, ... 240L including respective ANNs 250A, 250B, ... 250L to perform a mapping of multi-dimensional input vector 130/230 to a latent space as an invertible compound function of the form: $\hat{h} = h_L \circ \ldots \circ h_2 \circ h_1$, where each $h_i$ applies a piecewise-polynomial bijective transformation or piecewise-polynomial warp. It is noted that for the purposes of the present inventive principles, h is stable invertible with computationally tractable Jacobians. That constraint enables exact and fast inference of latent variables and consequently exact and fast probability density estimation.

Given a differential mapping h: $\mathcal{X} \rightarrow \mathcal{Y}$ of points $x \sim p_x(x)$ to points $y \in y$, the probability density $p_y(y)$ of transformed points $y = h(x)$ can be computed using the change of variables formula:

$$p_y(y) = p_x(x) \left| \det\left(\frac{\partial h(x)}{\partial x^T}\right) \right|^{-1}, \quad \text{Equation 1}$$

where $$\frac{\partial h(x)}{\partial x^T}$$

is the Jacobian of h at x.

The cost of computing the determinant in Equation 1 grows with the dimensionality of the Jacobian (e.g., cubicly if decomposition methods are used). If x and y are high-dimensional, determining $p_y(y)$ can be computationally intractable. However, the present solution avoids that intractability by focusing on a specific class of mappings, referred to as coupling layers, which admit Jacobian matrices where determinants reduce to the product of diagonal terms.

Figure 3:
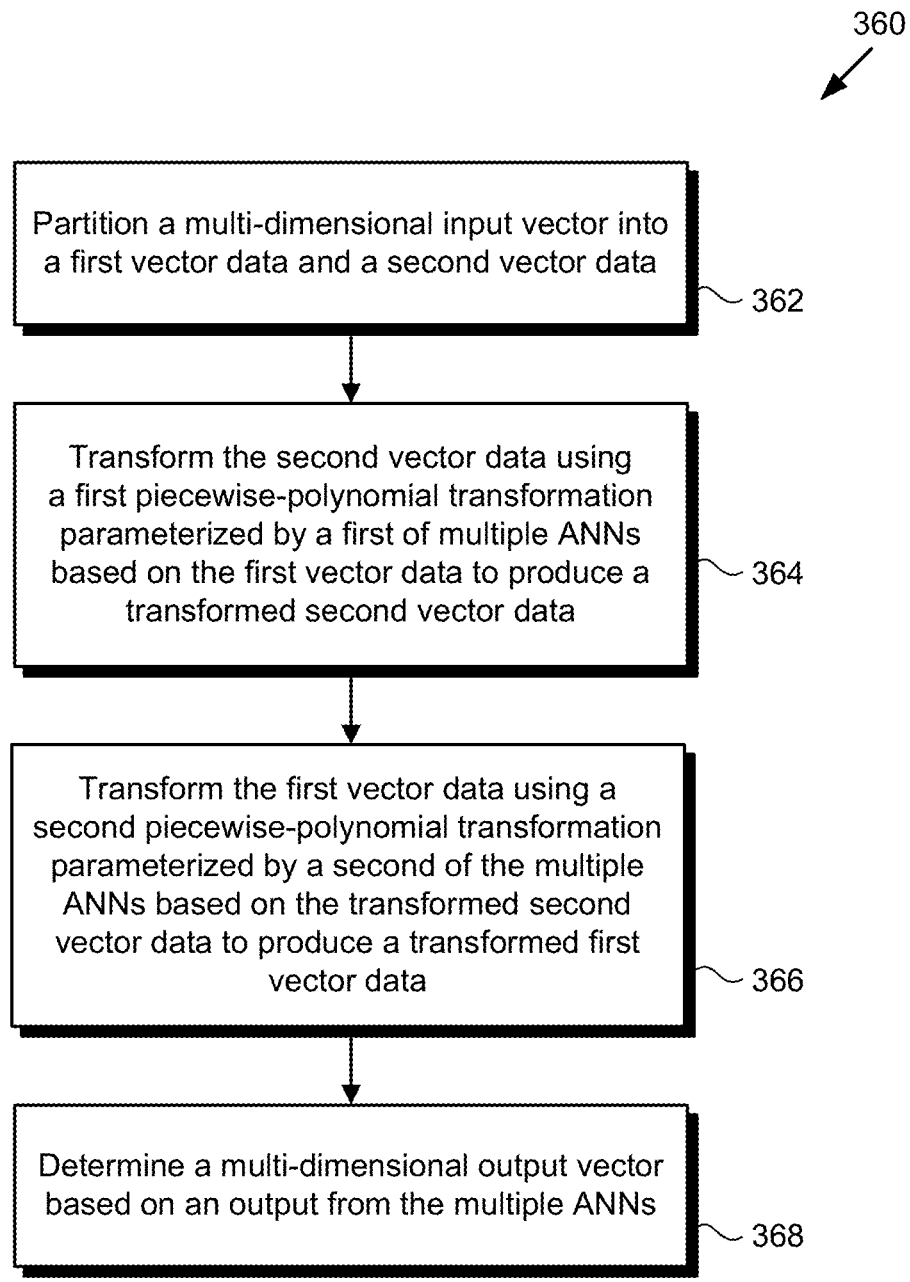
FIG. 3 shows a flowchart presenting an exemplary method for use by the system shown in FIG. 1.
Figure 4:
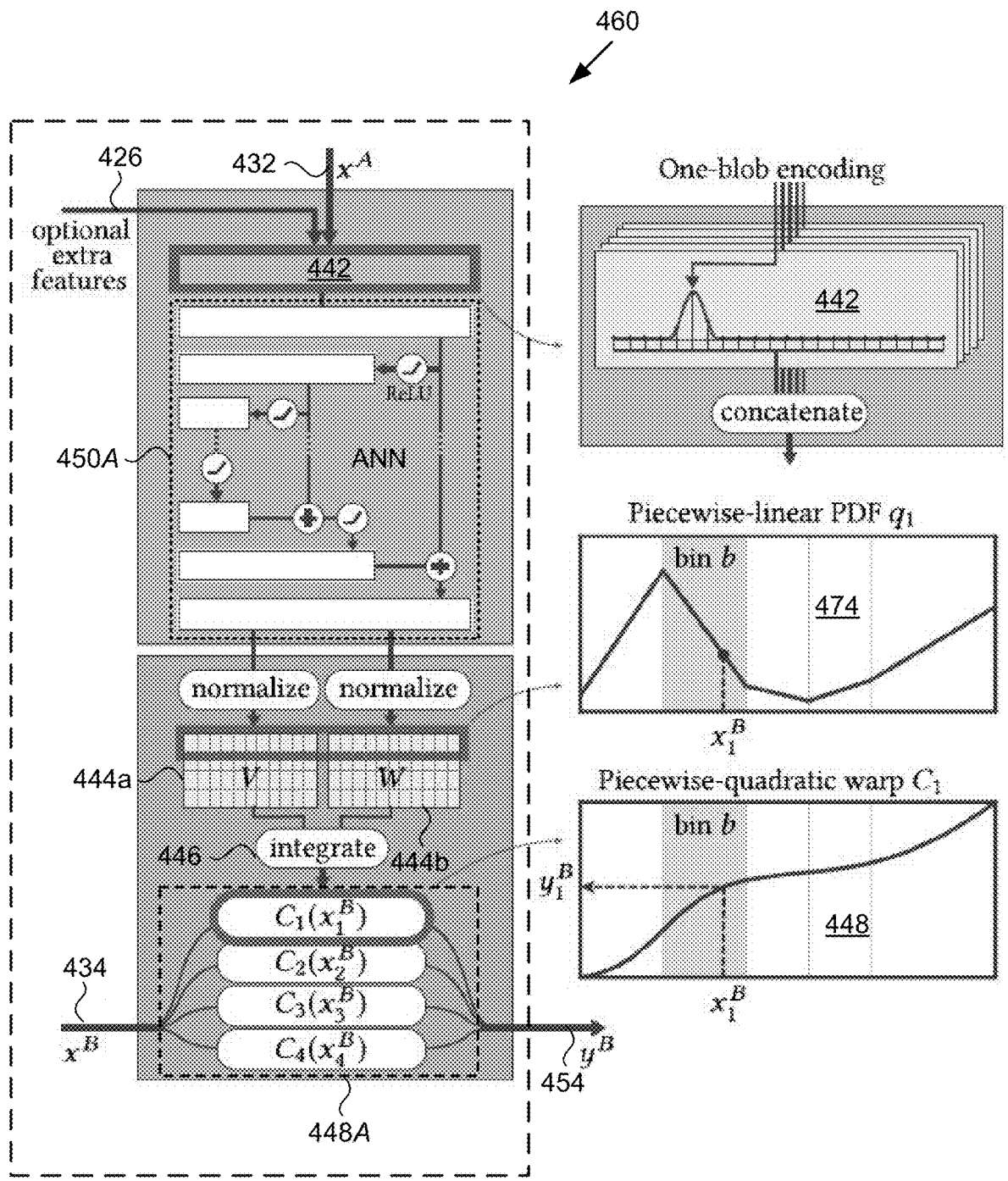
FIG. 4 shows a diagram of a portion of an exemplary piecewise-polynomial coupling layer including an artificial neural network (ANN), according to one implementation.

The functionality of software code 110/210 will be further described by reference to FIG. 3 in combination with FIGS. 1, 2, and 4. FIG. 3 shows flowchart 360 presenting an exemplary method for use by system 100, while FIG. 4 shows a diagram of a portion of an exemplary piecewise-polynomial coupling layer including an ANN configured to parameterize a piecewise-quadratic transformation, according to one implementation. With respect to the method outlined in FIG. 3, it is noted that certain details and features have been left out of flowchart 360 in order not to obscure the discussion of the inventive features in the present application.

Referring to FIG. 4, portion 460 of software code 110/210 corresponds in general to portion 260 of coupling layer 240A shown in FIG. 2. That is to say, portion 260 of software code 110/210 may share any of the characteristics attributed to portion 460 of coupling layer 240A by the present disclosure, and vice versa. In addition, first vector data 432, second vector data 434, transformed second vector data 454, ANN 450A, and piecewise-quadratic transformation 448A, in FIG. 4, correspond respectively in general to first vector data 232, second vector data 234, transformed second vector data 254, ANN 250A, and piecewise-polynomial transformation 248A, in FIG. 2. Thus, first vector data 232, second vector data 234, transformed second vector data 254, ANN 250A, and piecewise-polynomial transformation 248A may share any of the characteristics attributed to respective first vector data 432, second vector data 434, transformed second vector data 454, ANN 450A, and piecewise-quadratic transformation 448A by the present disclosure, and vice versa. Furthermore, each of piecewise-polynomial transformations 248B, ... 248L may share any of the characteristics attributed to piecewise-polynomial transformation 248A or piecewise-quadratic transformation 448A by the present disclosure.

It is noted that auxiliary data 426 shown in FIG. 4 corresponds in general to auxiliary data 126, in FIG. 1, and those corresponding features may share any of the characteristics attributed to either corresponding feature by the present disclosure. Also shown in FIG. 4 are one-blob encoding block 442, normalized matrices 444a and 444b providing piecewise-linear probability density function 474 ($q_1$), and integrator 446. Due to the correspondence of portion 260 of coupling layer 240A with portion 460 shown in FIG. 4, coupling layer 240A may include features corresponding respectively to any or all of one-blob encoding block 442, normalized matrices 444a and 444b providing piecewise-linear probability density function 474, and integrator 446. Moreover, each of coupling layers 240B, ... 240L may share any of the characteristics attributed to coupling layer 240A by the present disclosure.

It is also noted that although the actions included in flowchart 360 are described by reference to coupling layer 240A of software code 110/210, analogous actions are typically performed by each of coupling layers 240B through 240L. It is further noted that, as defined in the present application, the term "one-blob encoding" refers to a generalization of one-hot encoding known in the art. By contrast to one-hot encoding, in one-blob encoding a kernel is used to activate multiple adjacent entries rather than a single one. Assuming a scalar $s \in [0, 1]$ and a quantization of the unit interval into k bins, e.g., k=32, one-blob encoding amounts to placing a kernel, e.g., a Gaussian with $\sigma=1/k$, at s and discretizing it into the bins. By contrast to one-hot encoding, where the quantization causes a loss of information if applied to continuous variables, one-blob encoding is substantially lossless; i.e., it can capture the exact position of s.

Referring now to FIG. 3 in combination with FIGS. 1, 2, and 4, flowchart 360 begins with partitioning multi-dimensional input vector 130/230 into first vector data 232/432 and second vector data 234/434 (action 362). A single coupling layer, e.g., coupling layer 240A, takes a D-dimensional vector represented by multi-dimensional input vector 130/230 and partitions its dimensions into two groups: first vector data 232/432 ($x^A$) and second vector data 234/434 ($x^B$). First vector data 232/432 is left intact and is used by ANN 250A/450A to parameterize first piecewise-polynomial transformation 248A/448A used to transform second vector data 234/434 into transformed second vector data 254/454.

More formally, let $x \in \mathbb{R}^D$ be an input vector, i.e., multi-dimensional input vector 130/230, let A and B denote disjoint partitions of $[\![1, D]\!]$, and let m be a function on $\mathbb{R}^{|A|}$, then the output of a coupling layer: $y = (y^A, y^B) = h(x)$ is defined as:

$$y^A = x^A \qquad \text{Equation 2}$$

$$y^B = C(x^B, m(x^A)), \qquad \text{Equation 3}$$

where $m(x^A)$ denotes the parametrization performed by the ANN of the coupling layer, and where the coupling transform C: $\mathbb{R}^B \times M(\mathbb{R}^A) \to \mathbb{R}^B$ (hereinafter also "piecewise-polynomial transformation" shown as feature 248A/448A") is a separable and invertible map. The invertability of piecewise-polynomial transformation 248A/448A allows for probability density estimation and sample generation in Monte Carlo integration. Separability of piecewise-polynomial transformation 248A/448A ensures that the Jacobian matrix is triangular and the determinant reduces to the product of diagonal terms. As a result, the computation of the determinant scales linearly with D and therefore is tractable even in higher-dimensional problems.

It is noted that $x^A$ and $y^A$ shown in FIGS. 2 and 4 are also referred to herein as first vector data 232/432, $x^B$ is referred to as second vector data 234/434, and $y^B$ is referred to herein as transformed second vector data 254/454. Partitioning of multi-dimensional input vector 130/230 into first vector data 232/432 and second vector data 234/434 as described above may be performed by software code 110/210, executed by hardware processor 104 of computing platform 102.

Flowchart 360 continues with transforming second vector data 234/434 using first piecewise-polynomial transformation 248A/448A parameterized by first ANN 250A/450A based on first vector data 232/432 to produce transformed second vector data 254/454 (action 364). By way of example, first piecewise-polynomial transformation 248A/448A may take the form of a piecewise-linear transformation or, as shown in FIG. 4, piecewise-quadratic transformation 448A. Transformation of second vector data 234/434 to transformed second vector data 254/454 using first to piecewise-polynomial transformation 248A/448A parameterized by first ANN 250A/450A based on first vector data 232/432 may be performed by software code 110/210, executed by hardware processor 104 of computing platform 102, and using coupling layer 240A.

Because most problems span a finite domain, the present solution can operate in a unit hypercube, i.e., $x, y \in [0, 1]^D$. However, it is noted that unbounded domains can be handled by warping the input to $h_1$ and the output of $h_L$, for example, using the sigmoid and logit functions, respectively. As noted above, computationally tractable Jacobians are ensured by separability, i.e., $C(x^B) = \Pi_{i=1}^{|B|} C_i(x_i^B)$. Operating on unit intervals allows interpreting the piecewise-polynomial transformation $C_i$ as a cumulative distribution function (CDF). To produce each $C_i$, the corresponding ANN is configured to output an un-normalized probability density $q_i$, and $C_i$ is generated by integration using integrator 446.

As mentioned above, multi-dimensional input vector 130/230 may be a D-dimensional input vector input to software code 110/210. Moreover, multi-dimensional input vector 130/230 may be partitioned into two disjoint groups represented as first vector data 232/432 ($x^A$) and second vector data 234/434 ($x^B$) in action 362. The unit dimensions in second vector data $x^B$ may be further partitioned into K bins of equal width $w=K^{-1}$. In order to define all $|B|$ transforms of second vector data 234/434 ($x^B$) at once, ANN 250A/450A may be configured to predict a $|B| \times K$ matrix, denoted as $\hat{Q}$. Each i-th row of $\hat{Q}$ defines the un-normalized probability mass function (PMF) of the transformation in the i-th dimension in $x^B$. The rows may be normalized using the softmax function $\sigma$ and the normalized matrix can be denoted as Q; $Q_i = \sigma(\hat{Q}_i)$.

The probability density function in the i-th dimension may be defined as $q_i(x_i^B) = Qib/w$, where $b = \lfloor Kx_i^B \rfloor$ is the bin that contains the scalar value $x_i^B$. The probability density function can then be integrated using integrator 446 to produce an invertible piecewise-linear transformation $C_i$, shown in FIG. 2 as piecewise-polynomial transformation 248A:

$$C_i(x_i^B) = \int_0^{x_i^B} q_i(t)dt = \alpha Q_{ib} + \Sigma_{k=1}^{b-1} Q_{ik}, \quad \text{Equation 4}$$

where $\alpha = Kx_i^B - \lfloor Kx_i^B \rfloor$ represents the relative position of $x_i^B$ in b.

In order to evaluate the change in the probability density resulting from coupling layer 240A, the determinant of its Jacobian matrix can be computed. As noted above, because piecewise-polynomial transformation 248A/448A is separable, its Jacobian matrix is diagonal and the determinant is equal to the product of the diagonal terms. When piecewise polynomial transformation 248A is a piecewise-linear transformation, the determinant of its Jacobian matrix can be determined using Q:

$$\det\left(\frac{\partial c(x^B; m(x^A))}{\partial (x^B)^T}\right) = \Pi_{i=1}^{|B|} q_i(x_i^B) = \Pi_{i=1}^{|B|} \frac{Q_{ib}}{w}, \quad \text{Equation 5}$$

where $m(x^A)$ denotes parameterization provided by ANN 250A, and b once again denotes the bin containing the value in the i-th dimension.

Referring to FIG. 4, in implementations in which the piecewise-polynomial transformation parameterized by ANN 250A/450A is a piecewise-quadratic transformation, piecewise-linear probability density function 474 may be modeled using K+1 vertices. The vertical coordinates of those vertices may be stored for all dimensions of second vector data 234/434 in $|B| \times (K+1)$ matrix 444a (matrix V), while the horizontal differences between neighboring vertices, i.e., the bin widths, may be stored in $|B| \times K$ matrix 444b (matrix W).

It is noted that ANN 450A is implemented as a U-shaped neural network, or U-Net having fully connected layers. According to the exemplary implementation shown in FIG. 4, ANN 450A outputs un-normalized matrices $\hat{W}$ and $\hat{V}$. Those matrices can be normalized using the standard softmax for W, i.e., $W_i = \sigma(\hat{W}_i)$, and an adjusted version for V i.e.:

$$V_{i,j} = \frac{\exp(\hat{V}_{i,j})}{\sum_{k=1}^{K} \frac{\exp(\hat{V}_{i,k}) + \exp(\hat{V}_{i,k+1})}{2} W_{i,k}}, \quad \text{Equation 6}$$

where the denominator ensures that $V_i$ represents a normalized probability density.

The probability density function in dimension i is defined as:

$$q_i(x_i^B) = \text{lerp}(V_{ib}, V_{ib+1}, \alpha), \quad \text{Equation 7}$$

where "lerp" signifies linear interpolation and $\alpha = (x_i^B - \Sigma_{k=1}^{b-1} W_{ik})/W_{ib}$ represents the relative position of scalar $x_i^B$ in bin b that contains it, i.e., $\Sigma_{k=1}^{b-1} W_{ik} \leq x_i^B < \Sigma_{k=1}^{b} W_{ik}$.

Invertible piecewise quadratic transformation 448A can be obtained by integration using integrator 446 as:

$$C_i(x_i^B) = \frac{\alpha^2}{2}(V_{ib+1} - V_{ib}) + \alpha V_{ib} + \sum_{k=1}^{b-1} \frac{V_{ik} + V_{ik+1}}{2} W_{ik}. \quad \text{Equation 8}$$

It is noted that inverting $C_i(x_i^B)$ involves solving the root of the quadratic term, which can readily be performed using conventional techniques known in the art. It is further noted that computing the determinant of the Jacobian matrix follows the logic of the piecewise-linear case discussed above, with the difference that the entries of V must be interpolated in order to obtain the probability density function at a specific location.

As also discussed above, auxiliary data 126/426 and/or first vector data 232/432 may be provided as inputs to ANN 250A/450A and may be used by ANN 250A/450A to parameterize piecewise-polynomial transformation 248A/448A for transforming second vector data 234/434 into transformed second vector data 254/454. In some implementations, it may be advantageous or desirable to provide auxiliary data 126/426 and/or first vector data 232/432 as a one-blob encoded input, as described above, to ANN 250A/450A. Moreover, in some implementations, auxiliary data 126/426 may be provided as an input to each of ANNs 250A/450A, 250B, . . . 250L. Auxiliary data 126/426 may include one or more of a position of an object in a virtual 3D scene corresponding to multi-dimensional input vector 130/230, a view direction in the virtual 3D scene, and surface or other material properties of objects in the virtual 3D scene, for example, to help ANN 250A/450A learn a better probability distribution more rapidly.

Referring once again to FIG. 3, flowchart 360 continues with transforming first vector data 232/432 using second piecewise-polynomial transformation 248B parameterized by second ANN 250B based on transformed second vector data 254/454 to produce transformed first vector data 256 (action 366). It is noted that, like first piecewise-polynomial transformation 248A/448A, second piecewise-polynomial transformation 248B may take the form of a piecewise-linear transformation or a piecewise-quadratic transformation. That is to say, in some implementations first piecewise-polynomial transformation 248A/448A and second piecewise-polynomial transformation 248B may be piecewise-linear transformations, while in other implementations, first piecewise-polynomial transformation 248A/448A and second piecewise-polynomial transformation 248B may be piecewise-quadratic transformations.

Transformation of first vector data 232/432 to transformed first vector data 256 using second piecewise-polynomial transformation 248B parameterized by second ANN 250B based on transformed second vector data 254/454 may be performed by software code 110/210, executed by hardware processor 104 of computing platform 102, and using coupling layer 240B. Transformation of first vector data 232/432 to transformed first vector data 256 using second piecewise-polynomial transformation 248B may be performed using any or all of the techniques described above by reference to action 364. For example, in some implementations, transformed second vector data 254/454 may be provided as a one-blob encoded input to second ANN 250B.

It is noted that a complete transformation between the data space and the latent space is obtained by connecting multiple coupling layers in series, as shown in FIG. 2. A different instance of respective ANNs 250A/450A, 250B, . . . 250L is trained for each coupling layer. To ensure that all dimensions can be modified, the output of one coupling layer is fed into the next coupling layer with the roles of the two data partitions swapped. Compounding two coupling layers in this manner ensures that every dimension can be altered. The number of coupling layers required to ensure that each dimension can influence every other dimension depends on the total number of dimensions. For instance, in a 2D setting (where each partition contains exactly one dimension) only two coupling layers are required. 3D problems require three layers, and for any high-dimensional configuration there typically must be at least four coupling layers.

Flowchart 360 can conclude with determining multi-dimensional output vector 138/238 based on the output from ANNs 250A/450A, 250B, . . . 250L (action 368). Determination of multi-dimensional output vector 138/238 based on the output from ANNs 250A/450A, 250B, . . . 250L may be performed by software code 110/210, executed by hardware processor 104 of computing platform 102.

It is noted that in some implementations, hardware processor 104 may execute software code 110/210 to utilize ANNs 250A/450A, 250B, . . . 250L to produce many multi-dimensional output vectors corresponding to multi-dimensional output vector 138/238 for use in simulation of light transport in a 3D scene. It is further noted that such a Monte Carlo integration may be performed by extracting sampling probability density functions from observations of the integrand. For example, denoting q (x; θ) as the to-be-learned probability density function, with θ representing the trainable parameters, and denoting the ground-truth probability distribution of the integrand as p (x), the Monte Carlo estimator may be expressed as:

$$\langle F \rangle_N = \frac{1}{N} \sum_{i=1}^{N} \frac{f(X_i)}{q(X_i; \theta)} = \frac{1}{N} \sum_{i=1}^{N} \frac{p(X_i) F}{q(X_i; \theta)}. \quad \text{Equation 9}$$

In the ideal case when $q(x; \theta) = p(x)$, the Monte Carlo estimator returns the exact value of F. The objective of Equation 9 is to leverage NICE to learn q from multi-dimensional input vector 130/230 while optimizing ANNs 250A/450A, 250B, . . . 250L in respective coupling layers 240A, 240B, . . . 240L so that the distance between p and q is minimized. While all divergence metrics reach their minimum if both distributions are equal, they differ in shape and therefore typically produce different q in practice.

According to the present exemplary implementations, ANNs 250A/450A, 250B, . . . 250L are trained to substantially minimize the Kullback-Leibler divergence of the Monte Carlo estimator via gradient descent. In addition, or alternatively, the Chi-squared divergence (hereinafter "$\chi^2$ divergence") of the Monte Carlo estimator may be substantially minimized via gradient descent.

Kullback-Leibler (KL) Divergence:

Most generative models based on deep neural networks do not permit the likelihood $q(x; \theta)$ of data points x to be evaluated exactly or efficiently. By contrast, the present solution is based on bijective mappings with tractable Jacobian determinants that advantageously permit such evaluations. As explained below, minimizing the Kullback-Leibler divergence (hereinafter "KL divergence") via gradient descent amounts to directly maximizing a weighted log-likelihood.

The KL divergence between p(x) and the learned q (x; θ) may be expressed as Equation 8:

$$D_{KL}(p \| q; \theta) =$$
$$\int_\Omega p(x) \log \frac{p(x)}{q(x; \theta)} dx = \int_\Omega p(x) \log p(x) dx - \underbrace{\int_\Omega p(x) \log q(x; \theta) dx}_{\text{cross-entropy}}.$$

In order to minimize $D_{KL}$ via gradient descent, its gradient with respect to the trainable parameters θ is needed. Those parameters appear only in the cross-entropy term. As a result, Equation 10 states:

$$\nabla_\theta D_{KL}(p \| q; \theta) = -\nabla_\theta \int_\Omega p(x) \log q(x; \theta) dx = \mathbb{E}\left[-\frac{p(X)}{q(X; \theta)} \nabla_\theta \log q(X; \theta)\right],$$

where the expectation assumes X~q(x; θ), i.e., the samples are drawn from the learned generative model. In most integration problems, p(x) is only accessible in an un-normalized form through f(x): p(x)=f(x)/F. Since F is unknown, the gradient can be estimated only up to the global scale factor F. This does not present an obstacle, however, because commonly used gradient descent based optimization techniques scale the step size by the reciprocal square root of the gradient variance, thereby canceling F. Equation 10 shows that minimizing the KL divergence via gradient descent is equivalent to minimizing the negative log-likelihood weighted by Monte Carlo estimates of p(x).

Thus, in some implementations, ANNs 250A/450A, 250B, . . . 250L may be trained to minimize or substantially minimize the KL divergence between a ground-truth probability distribution and the trained probability distribution parametrized by ANNs 250A/450A, 250B, . . . 250L.

Minimizing Variance Via $\chi^2$ Divergence:

An attractive quantity to minimize in the context of unbiased Monte Carlo integration is the variance of the Monte Carlo estimator. According to Equation 11, that variance $\mathbb{V}$ can be expressed as:

$$\mathbb{V}\left[\frac{p(X)}{q(X; \theta)}\right] = \mathbb{E}\left[\frac{p(X)^2}{q(X; \theta)^2}\right] - \mathbb{E}\left[\frac{p(X)}{q(X; \theta)}\right]^2 = \int_\Omega \frac{p(x)^2}{q(x; \theta)} dx - \underbrace{\left(\int_\Omega p(x) dx\right)^2}_{1}.$$

The variance in Equation 11 can be minimized via gradient descent using Equation 12:

$$\nabla_\theta \mathbb{V}\left[\frac{p(X)}{q(X; \theta)}\right] = \nabla_\theta \int_\Omega \frac{p(x)^2}{q(x; \theta)} dx$$
$$= \int_\Omega p(x)^2 \nabla_\theta \frac{1}{q(x; \theta)} dx$$
$$= \int_\Omega -\frac{p(x)^2}{q(x; \theta)} \nabla_\theta \log q(x; \theta) dx$$
$$= \mathbb{E}\left[-\left(\frac{p(X)}{q(X; \theta)}\right)^2 \nabla_\theta \log q(x; \theta)\right].$$

It is noted that the variance objective of Equation 11 is equivalent to the Pearson $\chi^2$ divergence $D_{\chi^2}(p\|q;\theta)$ expressed by Equation 13 as:

$$D_{\chi^2}(p\|q;\theta) = \int_\Omega \frac{(p(x)-q(x;\theta))^2}{q(x;\theta)}dx = \int_\Omega \frac{p(x)^2}{q(x;\theta)}dx - 2\int_\Omega p(x)dx + \underbrace{\int_\Omega q(x;\theta)dx}_{1}.$$

Consequently, minimizing the variance of the Monte Carlo estimator function amounts to minimizing the Pearson $\chi^2$ divergence between the ground-truth and the learned distributions.

As noted above, in some implementations, multi-dimensional output vector 138/238 may be utilized to perform simulation of light transport in a 3D scene. As also note above, such light transport simulation may take the form of light path sampling or light path guiding.

Thus, in some implementations, ANNs 250A/450A, 250B, ... 250L may be trained to minimize or substantially minimize the $\chi^2$ divergence between a ground-truth probability distribution and the trained probability distribution parametrized by ANNs 250A/450A, 250B, ... 250L.

Light Path Sampling:

In order to determine produce an image, a renderer must estimate the amount of light reaching a camera after taking any of the possible paths through the scene. The transport can be formalized using the path-integral formulation, where a radiance measurement I to a sensor (e.g., a pixel) is expressed as:

$$I = \int_{\mathcal{P}} L_e(x_0, x_1) T(\bar{x}) W(x_{k-1}, x_k) d\bar{x}. \qquad \text{Equation 14}$$

The chain of positions $\bar{x} = x_0 \ldots x_k$ represents a single light path with k vertices. The path throughput $T(\bar{x})$ quantifies the ability of $\bar{x}$ to transport radiance. $W(x_{k-1}, x_k)$ is the sensor response to one unit of incident radiance.

The measurement of radiance can be estimated as:

$$\langle I \rangle = \frac{1}{N}\sum_{j=1}^{N} \frac{L_e(x_{j0}, x_{j1}) T(\bar{x}_j) W(x_{jk-1}, x_{jk})}{q(\bar{x}_j)}, \qquad \text{Equation 15}$$

where $q(\bar{x})$ is the joint probability density of generating all k vertices of path $\bar{x}$. Drawing samples directly from the joint distribution is challenging due to the constrained nature of vertices; e.g., they have to reside on surfaces. One approach to these challenges is to operate in the primary sample space (PSS) represented by a unit hypercube u. A path may then be obtained by transforming a vector of random numbers $z \in u$ using one of the standard path-construction techniques $\rho$ (e.g., camera tracing): $\bar{x} = \rho(z)$ Given that NICE scales well to high-dimensional problems, applying it in PSS can be performed as follows. The dimensions of u are partitioned into two equally-sized groups: first vector data 232/432 "group A" and second vector data 234/434 "group B", where group A contains the even dimensions and group B contains the odd dimensions. One group serves as the input of an ANN (each dimension is processed using the one-blob encoding) while the other group is being transformed; their roles are swapped in the next coupling layer. To infer the parameters θ of the ANNs, one of the KL divergence and the $\chi^2$ divergence of the Monte Carlo estimator described above is minimized against $p = (\bar{x}) = L_e(x_0,x_1) T(\bar{x}) W(x_{k-1}, x_k) F^{-1}$, ignoring the unknown normalization factor, i.e., assuming F=1.

In order to obtain a path sample $\bar{x}$, a random vector z is generated, z is transformed using the reversed inverted coupling layers, and a path construction technique is applied, e.g.: $\bar{x} = \rho(h_1^{-1}( \ldots h_L^{-1}(z)))$.

Light Path Guiding:

An alternative to formalizing light transport using the path-integral formulation is to adopt a local view and focus on the radiative equilibrium of individual points in a scene. The equilibrium radiance at a surface point x in direction $\omega_0$ is given by the rendering equation:

$$L_0(x,\omega_0) = L_e(x,\omega_0) + \int_\Omega L(x,\omega) f_s(x,\omega_0,\omega)|\cos\gamma|d\omega, \qquad \text{Equation 16}$$

where $f_s$ is the bidirectional scattering distribution function, $L_0(x, \omega_0)$, $L_e(x, \omega_0)$, and $L(x, \omega)$ are respectively the reflected, emitted, and incident radiance, Ω is the unit sphere, and γ is the angle between ω and the surface normal.

The rendering task is formulated as finding the outgoing radiance at points directly visible from the sensor. The overall efficiency of the renderer depends on the variance of estimating the amount of reflected light:

$$\langle L_r(x,\omega_0)\rangle = \frac{1}{N}\sum_{j=1}^{N} \frac{L(x,\omega_j) f_s(x,\omega_0,\omega_j)|\cos\gamma_j|}{q(\omega_j|x,\omega_0)}. \qquad \text{Equation 17}$$

While the density is defined over a 2D space, it is conditioned on position x and direction $\omega_0$. These extra five dimensions make the goal of $q(\omega|x, \omega_0)$ a $L(x, \omega) f_s(x, \omega_0, \omega)|\cos\gamma|$ substantially harder. Since the 7D domain is fairly challenging to handle using conventional handcrafted, spatio-directional data structures in the general case, most conventional work has focused on the simpler 5D setting where $q(\omega|x, \omega_0) \propto L(x, \omega)$.

According to one implementation of the present inventive concepts, a single incidence of NICE is used, which may be trained and sampled in an interleaved manner. In the most general setting, $q(\omega|x, \omega_0)$ is learned that is proportional the product of all terms in the integrand. Since the integration domain is only 2D, first vector data 232/432 and second vector data 234/434 in all coupling layers contain only one dimension each, i.e., one of the two cylindrical coordinates used to parameterize the sphere of direction. Referring to first coupling layer 240A by way of example, ANN 250A/450A takes the cylindrical coordinate from first vector data 232/432, and may utilize the position x and direction $\omega_0$ that condition the density and any other local shading information that may improve inference as auxiliary data 126, to produce the parameters of piecewise-polynomial transformation 248A/448A. It is noted that the normal of the intersected shape at x may also be included in auxiliary data 126 to aid ANN 250A/450A in learning distributions which correlate strongly with the local shading frame.

All of the inputs to ANN 250A/450A may be one-blob encoded, as described above. The parameter x can be normalized by the scene bounding box, each coordinate being encoded independently, and the results may be concatenated into a single array of 3×k values. An analogous procedure is followed for the directions, which may be parameterized using world-space cylindrical coordinates. For example, each coordinate may be transformed to the [0, 1] interval, may be encoded, and may be appended to the array.

At any given point during rendering, a sample may be generated by drawing a random pair $u \in [0, 1]^2$, passing it through the inverted coupling layers in reverse order, $h_1^{-1}(\ldots h_L^{-1}(u))$, and transforming to the range of cylindrical coordinates to obtain co.

The approach to product sampling disclosed in the present application has at least three distinct advantages over conventional solutions. First, it is agnostic to the number of dimensions that the 2D domain is conditioned on. This allows for accounting for the full triple product L (x, $\omega_j$)$f_s$(x, $\omega_0$, $\omega_j$)|cos $\gamma_j$| without additional sophisticated data structures. Extra information can simply be provided as additional inputs to the ANNs allowing them to learn from data which dimensions are useful in which situations.

A second advantage is that the present solution does not require any precomputation, such as fitting of scene-dependent materials into a mixture of Gaussians. User 124 only needs to specify the hyper-parameters, e.g., the number of coupling layers, the number of bins for the piecewise-polynomial transformation, and the architecture of the ANNs.

A third advantage is that the present solution offers trivial persistence across renders. For example, a set of ANNs trained on one camera view can be easily reused from a different view or within a slightly modified scene. Unlike conventional approaches, where the learned data structure requires explicit support of adaptation to new scenes, ANNs can be adapted by the same optimization procedure used in the initial training. As a result, for example, applying the present solution to animations could thus advantageously yield super-linear cost savings.

Moreover, and as noted above, high-dimensional data typically requires at least four coupling layers, each including a respective ANN. Thus, in some implementations, the light transport simulation techniques described above may advantageously be performed using multi-dimensional output vector 138/238 provided by software code 110/210 when software code 110/210 includes less than five ANNs.

The present disclosure provides systems utilizing ANNs trained to guide the construction of paths towards important regions such that the efficiency of an image rendering algorithm is maximized, as well as to methods for use by those systems. It is noted that, as defined in the present application, an ANN is a deep artificial neural network including layers that each applies an operation to an input to the ANN. Such an ANN is a machine learning engine designed to progressively improve its performance of a specific task. In various implementations, ANNs may be utilized to perform image processing or natural-language processing. As presented above, sampling distributions may be learned as paths are constructed, with the goal of sampling paths more and more intelligently and thereby reducing noise. In one implementation, for example, an ANN may be used to improve path guiding for rendering difficult or technically challenging scenes.

One distinction of the approach disclosed in the present application when compared to conventional path guiding techniques is that the approach disclosed by the present application utilizes an ANN that produces bijective mappings with tractable Jacobians to guide the construction of light paths. That is to say, rather than handcrafting a subdivision scheme over potentially many dimensions, the present approach trains an ANN that is able to learn the high-dimensional function end-to-end. Consequently, the approach disclosed in the present application can automatically adapt to non-uniform scenes and highly non-linear distributions such as those found in rendering. Furthermore, in contrast to conventional techniques, the present approach can advantageously learn the full 7-dimensional distribution of the product of the reflectance function and the incident radiance function, rather than merely the 5-dimensional incident radiance function.

In order for a distribution learned by an ANN to be useful for a Monte Carlo simulation, a network architecture that permits efficient sampling from the learned distribution while also enabling efficient evaluation of the probability density of samples is needed. A network architecture utilizing real-valued non-volume preserving transformations (hereinafter "Real NVP") provides a suitable framework. A conventional approach to the use of Real NVP in estimating probability densities is described by the publication "Density Estimation Using Real NVP," by Dinh et al., arXiv preprint arXiv:1605.08803 (2016), which is hereby incorporated fully by reference into the present application.

In one implementation, the Real NVP approach disclosed by Dinh et al. may be modified according to an implementation of the present disclosure for performance improvement. For example, in order to improve Real NVP path guiding, the present disclosure provides a different scheme for warping sample distributions. It is noted that, as used in the present disclosure, the term "warp" is equivalent to the expression "bijective transformation." Thus "warping" a sample distribution refers to applying a bijective transformation to the sample distribution. In one implementation, the present disclosure provides a method for warping a uniform multi-dimensional sampling distribution for importance sampling using multiple warp layers (hereinafter also "coupling layers"), where the warp parameters are determined by an ANN. In one implementation, the coupling layers are following Real NVP, or at least correspond to relevant aspects of Real NVP. In one implementation, the coupling layers apply piecewise-polynomial transformations, where the polynomials may be linear or quadratic, for example. In one implementation, the warp bins utilized in the transformation may vary in width. In one implementation, the sampling is applied to light path guiding.

Real NVP operates by repeatedly applying parametric bijections (with parameters learned by neural networks) with tractable Jacobian. These bijections are simplistic in the conventional formulation, and, consequently, a chain of many simplistic bijections is required to capture complex non-linear behavior. By contrast, the present disclosure utilizes a certain family of more expressive bijections that overcome that disadvantage associated with conventional Real NVP. As a result, the approach described in the present disclosure advantageously captures complex behavior with as few as two such expressive bijections in sequence.

Further, in some implementations, auxiliary data is fed to the ANN (such as a position of an object in a virtual 3D scene, a view direction in the virtual 3D scene, or surface or other material properties of objects in the virtual 3D scene) to help the ANN learn a better distribution at a faster pace. The auxiliary data may be encoded in various bases for further efficiency gains. In addition, the present disclosure derives formulas for optimizing either Kullback-Leibler divergence between distribution learned by the ANN and the ground-truth, or the variance of the path tracer, using gradient descent. These formulas are used to apply Real NVP to the problem addressed by the present disclosure.

Thus, when compared to Real NVP, the present approach introduces sophisticated transformation functions that lead to significantly more expressive models at equal computational cost. The approach described in the present disclosure provides a significant improvement over conventional Real NVP on canonical two-dimensional (2D) examples and when using the Real NVP architecture for light path guiding.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a system memory storing a software code including a plurality of artificial neural networks (ANNs);
the hardware processor configured to execute the software code to:
partition a multi-dimensional input vector into a first vector data and a second vector data;
transform the second vector data using a first piecewise-polynomial transformation parameterized by a first ANN of the plurality of ANNs, based on the first vector data, to produce a transformed second vector data;
transform the first vector data using a second piecewise-polynomial transformation parameterized by a second ANN of the plurality of ANNs, based on the transformed second vector data, to produce a transformed first vector data; and
determine a multi-dimensional output vector based on an output from the plurality of ANNs, wherein the output is produced using the transformed first vector data from the second ANN and the transformed second vector data from the first ANN.

2. The system of claim 1, wherein the first piecewise-polynomial transformation comprises a piecewise-linear transformation.

3. The system of claim 1, wherein the first piecewise-polynomial transformation comprises a piecewise-quadratic transformation.

4. The system of claim 1, wherein the hardware processor is further configured to execute the software code to:
provide the first vector data as a first one-blob encoded input to the first ANN; and
provide the transformed second vector data as a second one-blob encoded input to the second ANN.

5. The system of claim 1, wherein the hardware processor is further configured to execute the software code to:
train the plurality of ANNs to substantially minimize a Kullback-Leibler divergence between a ground-truth probability distribution and a trained probability distribution parametrized by the plurality of ANNs.

6. The system of claim 1, wherein the hardware processor is further configured to execute the software code to:
train the plurality of ANNs to substantially minimize a $\chi^2$ divergence between a ground-truth probability distribution and a trained probability distribution parametrized by the plurality of ANNs.

7. The system of claim 1, wherein the multi-dimensional output vector output by the plurality of ANNs is used in a Monte Carlo simulation of light transport in a three-dimensional (3D) scene.

8. The system of claim 7, wherein the plurality of ANNs comprises less than five ANNs.

9. The system of claim 7, wherein the Monte Carlo simulation of light transport is one of light path sampling or light path guiding.

10. The system of claim 7, wherein the hardware processor is further configured to execute the software code to:
provide an auxiliary data as an input to each of the plurality of ANNs, the auxiliary data comprising at least one of a position of an object in a virtual 3D scene corresponding to the multi-dimensional input vector, a view direction in the virtual 3D scene, and surface properties of objects in the virtual 3D scene.

11. A method for use by a system including a computing platform having a hardware processor and a system memory storing a software code including a plurality of artificial neural networks (ANNs), the method comprising:
partitioning, using the hardware processor, a multi-dimensional input vector into a first vector data and a second vector data;
transforming, using the hardware processor, the second vector data using a first piecewise-polynomial transformation parameterized by a first ANN of the plurality of ANNs, based on the first vector data, to produce a transformed second vector data;
transforming, using the hardware processor, the first vector data using a second piecewise-polynomial transformation parameterized by a second ANN of the plurality of ANNs, based on the transformed second vector data, to produce a transformed first vector data; and
determining, using the hardware processor, a multi-dimensional output vector based on an output from the plurality of ANNs, wherein the output is produced using the transformed first vector data from the second ANN and the transformed second vector data from the first ANN.

12. The method of claim 11, wherein the first piecewise-polynomial transformation comprises a piecewise-linear transformation.

13. The method of claim 11, wherein the first piecewise-polynomial transformation comprises a piecewise-quadratic transformation.

14. The method of claim 11, further comprising:
providing, using the hardware processor, the first vector data as a first one-blob encoded input to the first ANN; and
providing, using the hardware processor, the transformed second vector data as a second one-blob encoded input to the second ANN.

15. The method of claim 11, further comprising:
training the plurality of ANNs to substantially minimize a Kullback-Leibler divergence between a ground-truth probability distribution and a trained probability distribution parametrized by the plurality of ANNs.

16. The method of claim 11, further comprising:
training the plurality of ANNs to substantially minimize a $\chi^2$ divergence between a ground-truth probability distribution and a trained probability distribution parametrized by the plurality of ANNs.

17. The method of claim 11, further comprising:
using the multi-dimensional output vector output by the plurality of ANNs in a Monte Carlo simulation of light transport in a three-dimensional (3D) scene.

18. The method of claim 17, wherein the plurality of ANNs comprises less than five ANNs.

19. The method of claim 17, wherein the simulation of light transport is one of light path sampling or light path guiding.

20. The method of claim 17, further comprising:
providing, using the hardware processor, an auxiliary data as an input to each of the plurality of ANNs, the auxiliary data comprising at least one of a position of an object in a virtual 3D scene corresponding to the multi-dimensional input vector, a view direction in the virtual 3D scene, and surface properties of objects in the virtual 3D scene.

* * * * *